April 22, 1930.  J. W. KOEHL ET AL  1,755,401
AUTOMATIC BORING MACHINE
Filed June 23, 1928   5 Sheets-Sheet 1

INVENTORS
JOHN W. KOEHL
CARL PALKOWSKI
STEFAN WAGNER
BY
ATTORNEY.

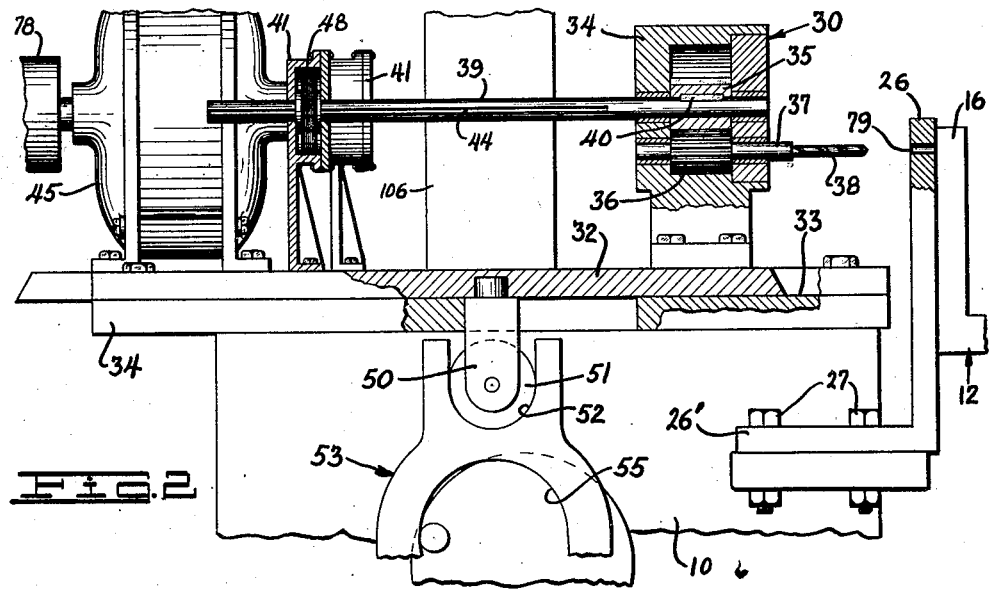
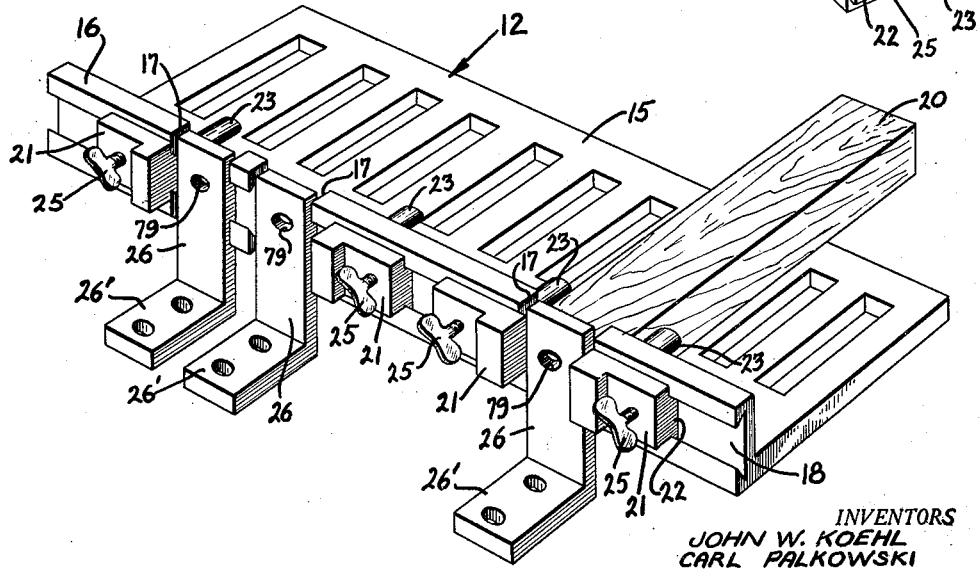

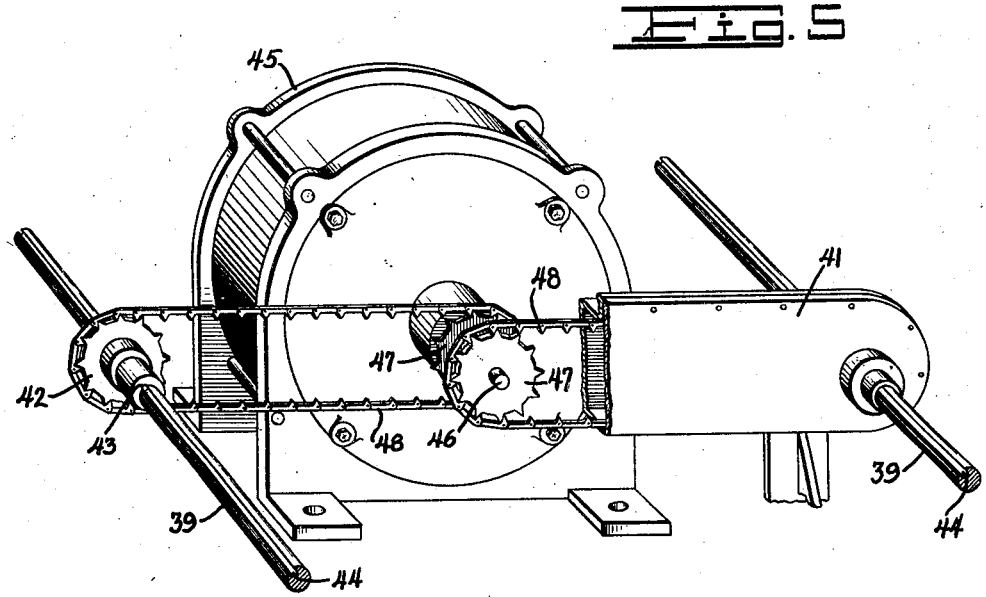
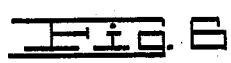
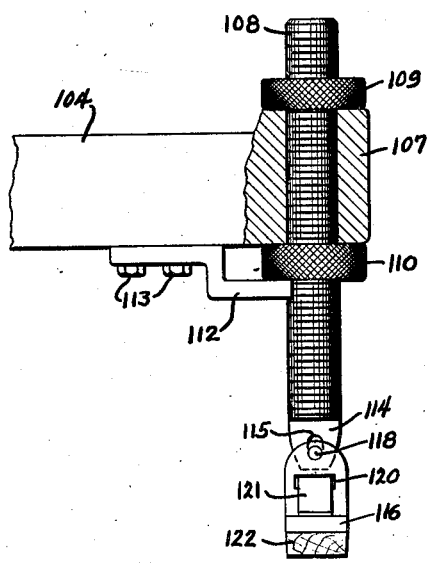
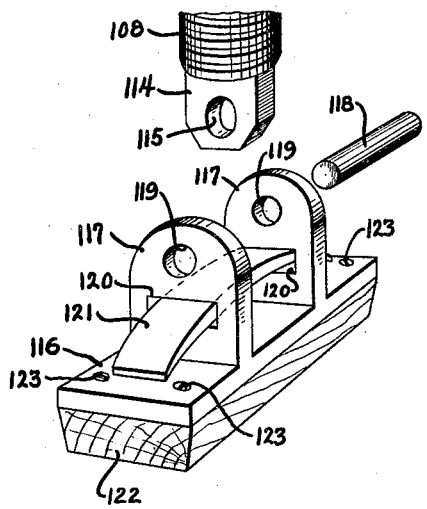

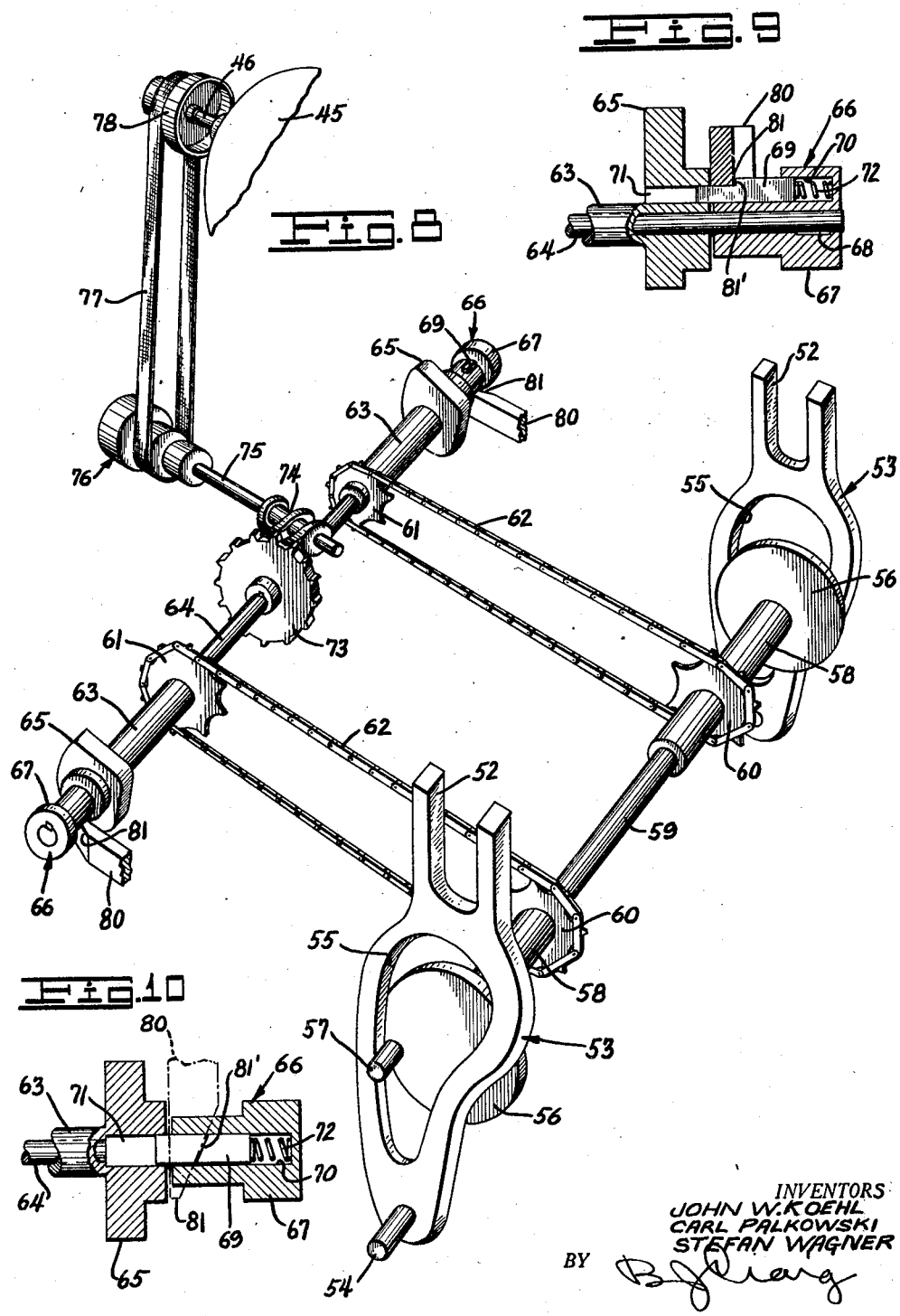

April 22, 1930.　　J. W. KOEHL ET AL　　1,755,401
AUTOMATIC BORING MACHINE
Filed June 23, 1928　　5 Sheets-Sheet 5
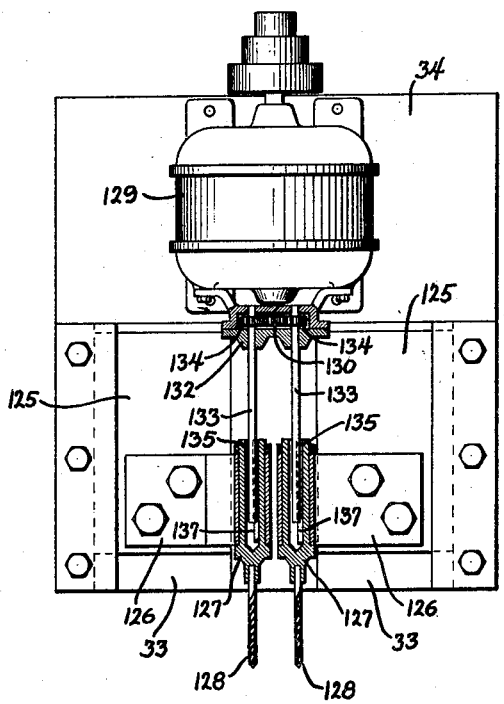
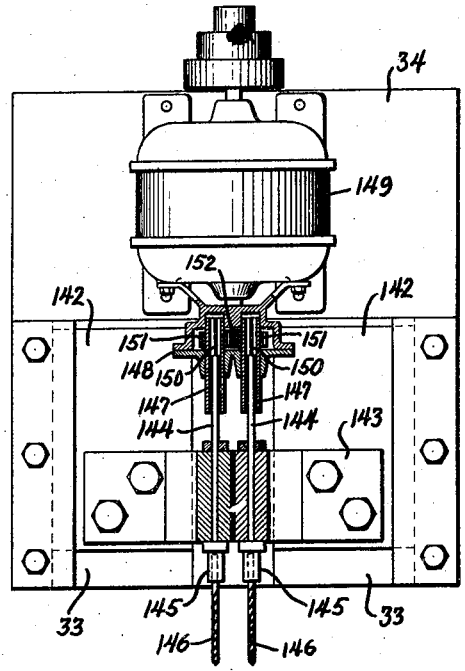
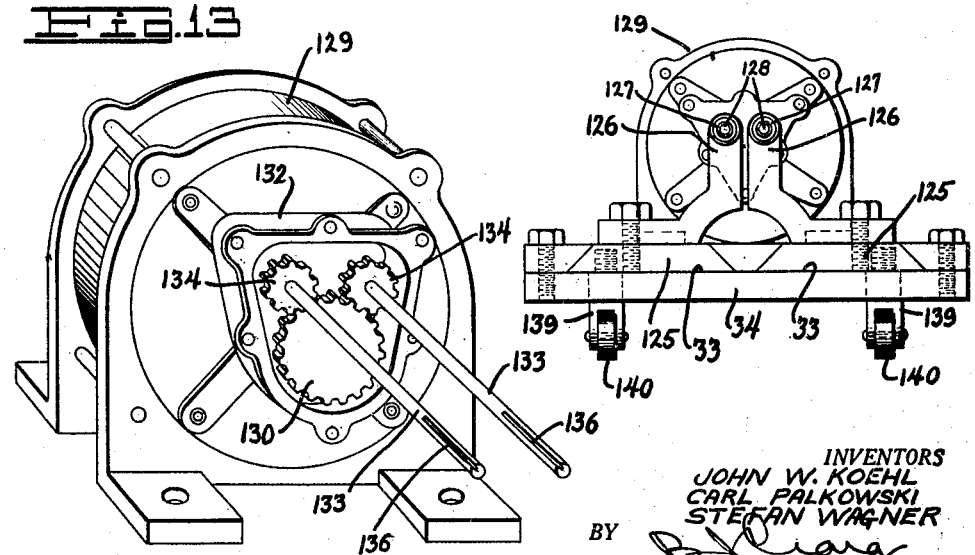
INVENTORS
JOHN W. KOEHL
CARL PALKOWSKI
STEFAN WAGNER
BY
ATTORNEY.

Patented Apr. 22, 1930

1,755,401

UNITED STATES PATENT OFFICE

JOHN W. KOEHL, CARL PALKOWSKI, AND STEFAN WAGNER, OF LOS ANGELES, CALIFORNIA

AUTOMATIC BORING MACHINE

Application filed June 23, 1928. Serial No. 287,660.

This invention relates to boring machines.

The general object of the invention is to provide an improved duplex boring machine.

A further object of the invention is to provide a boring machine including a base having a work table thereon and having a pair of drill holding members mounted for independent movement towards work on the work table.

Another object of the invention is to provide a boring machine including a work table and a drill holding member movable towards said work table together with improved means for moving the drill holding member towards the work table.

A further object of the invention is to provide a boring machine having a work table thereon, and having a movable work holding member and a novel chuck mounting together with novel means for causing automatic movement of said work holding member and said chuck.

Another object of the invention is to provide a novel work holding member for a drilling head.

An additional object of the invention is to provide a novel means for moving a drilling head towards a work table.

A further object of the invention is to provide a drilling device including a plurality of driving spindles and a novel means for driving said spindles.

Other objects of the invention will be apparent from the following description taken in connection with the accompanying drawings wherein:

Fig. 2 is a fragmentary side elevation partly in section showing the drilling head.

Fig. 3 is a perspective view of the work table.

Fig. 4 is a perspective view of one of the work positioning blocks.

Fig. 5 is a perspective view partly in section showing the drive means.

Fig. 6 is a fragmentary elevation partly in section showing the adjustable hold down clamp.

Fig. 7 is a perspective view of the hold down clamp.

Fig. 8 is a perspective view showing the driving means for shifting the boring head.

Fig. 9 is a sectional view showing a clutch.

Fig. 10 is a similar view taken at right angles to the section on which Fig. 9 is taken.

Fig. 12 is a plan view partly in section showing a modified form of drilling head.

Fig. 13 is a perspective view showing the actuating parts of the head shown in Fig. 12.

Fig. 14 is a front view of the head shown in Fig. 12 and

Fig. 15 is a view similar to Fig. 12 showing a further modification.

Figure 1:
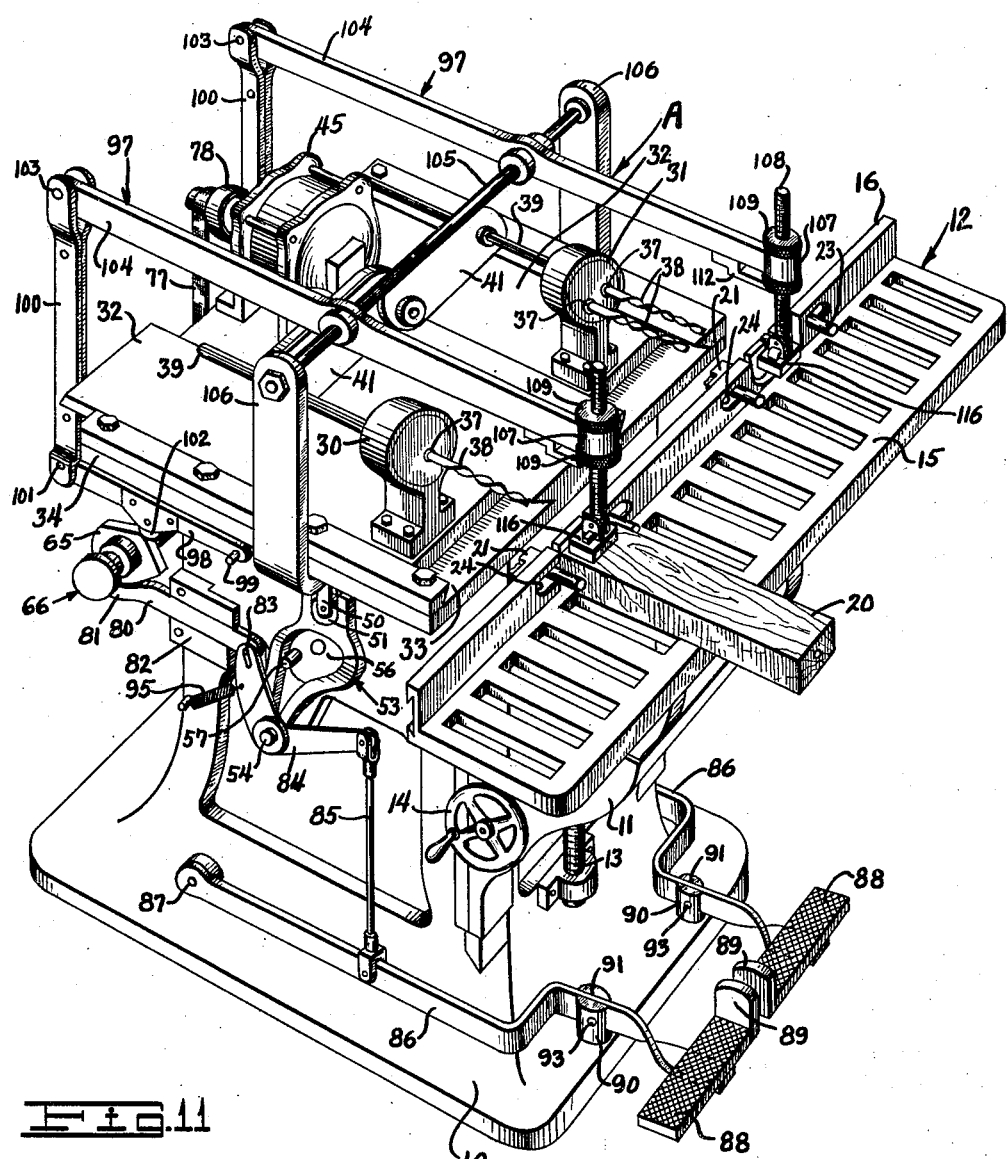
Fig. 1 is a perspective view of a drilling machine embodying the features of our invention.

Referring to the drawings by reference characters we have indicated a machine embodying the features of our invention generally at A in Fig. 1. As shown, this machine includes a base 10 having a vertically movable bracket 11 thereon upon which is mounted a work table 12. The bracket 11 may be vertically moved in any desired manner as by a threaded rod 13 actuated by a hand wheel 14.

As shown in Figs. 1 and 3 the work table 12 includes a horizontal bed 15 and a vertical flange 16 having cut-away portions 17 therein and having an undercut groove 18 in the face thereof opposite the bed 15. The work, such as a wooden member 20 shown in Figs. 1 and 3, is adapted to be held by hand. To correctly position the work 20 sliding blocks 21 are provided.

As shown in Figs. 1, 3 and 4, a single one of these blocks include a tongue 22 adapted to be positioned in the undercut groove 18 of the table flange 16 and a dowel 23 which is adapted to extend through and move in a slot 24 in the table flange 16. For clamping the block in the desired position a thumb screw 25 is provided which engages a threaded aperture in the block and is adapted to bear against the bottom of the groove 18 when tightened to clamp the block in position.

Positioned in each of the cut away portions 17 of the flange we arrange a guide member 26 having a foot 26' thereon which is adapted to be secured to the base 10 as shown in Fig. 2 by bolts 27.

For drilling apertures in the work 20, drill heads 30 and 31 are provided, each of which is secured to a slide 32 mounted in undercut guideways 33 on a bed 34 of the base 10 as shown in Figs. 1 and 2. As shown the head 30 includes a housing 34 (Fig. 2) having a central gear 35 therein which is adapted to drive one or more gears 36 each mounted on a drill holding chuck or spindle 37 journaled in the housing. Each chuck is adapted to receive a drill 38.

When it is desired to drill more than one hole at a time in a piece of work 20 as in the case of the head 31, the plurality of gears 36 and drill chucks 37 will be provided in the head.

The central gear in each of the heads 30 and 31 is adapted to be driven by a shaft 39 secured thereto as by a key 40. The opposite ends of each of the shafts 39 is supported in a housing (Fig. 5). In each of the housings there is provided a sprocket wheel 42 positioned on the shafts 39. Each of the sprocket wheels 42 is provided with a spline 43 which is adapted to actuate in a slot 44 provided in the associated shaft 39 as clearly shown in Fig. 5.

For driving each of the sprocket wheels 42 a source of power shown as an electric motor 45 is provided. When a motor is used the armature shaft 46 of the motor has a pair of sprocket wheels 47 thereon. A pair of sprocket chains 48 extend from the motor sprocket wheels 47 to each of the sprocket wheels 42. Thus it will be seen that when the motor 45 operates the sprocket wheels 37 will, through the medium of the chains 48, drive the sprocket wheels 42 which in turn will drive the shafts 39 and the gears 35 thereon in the heads 30 and 31 and the gears 35 will drive the drill chucks 37.

For reciprocating the slides 32 a downwardly extending arm 50 is provided on each slide. Each arm 50 has a roller 51 thereon which fits in a U-shaped notch 52 of a rocker arm 53. Each rocker arm 53 is pivoted to the base 10 as at 54 and is provided with an internal cam surface 55 as shown in Fig. 8.

For rocking each of the arms 53 disks 56 are provided. Each disk is provided with a projection 57 which is adapted to engage the cam surface 55. Each of the disks 56 include an elongated hub 58 loosely mounted on a shaft 59 and a sprocket wheel 60 is secured to each of the hubs. Each of the sprocket wheels 60 is adapted to be driven from another sprocket wheel 61 through the medium of a sprocket chain 62. The sprocket wheels 61 each include an elongated hub 63 loosely mounted on a shaft 64. Adjacent to the outer ends of each of the hubs and fixed thereto a cam member 65 is provided.

Adjacent each of the cam members 65 a clutch mechanism 66 (Figs. 9 and 10) which includes a collar 67 is secured to the shaft 64 as by a key 68. The clutch mechanisms 68 are of the well known key pulling type such as commonly employed in metal stamping presses and as shown in Figs. 9 and 10 includes a key 69 positioned in a recess 70 in the collar 67 and adapted to be normally urged into a recess 71 in the cam member 65 by a coiled spring 72.

The shaft 64 is shown as adapted to be driven by a worm wheel 73 which is driven by a worm 74 on a shaft 75 which is adapted to be driven by a set of stepped pulleys 76. The pulleys 76 are shown as driven through the medium of a belt 77 from another set of pulleys 78 mounted on the armature shaft 46 of the motor 45.

From the foregoing description it will be apparent that when the motor 45 is operated the pulleys 78 will, through the medium of the belt 77, drive the pulleys 76 which in turn will drive the shaft 75 and the worm gear 74. The worm gear 74 will drive the worm wheel 73 which in turn will drive the shaft 64 and as the clutch collars 67 are each keyed to the shaft 64 they in turn will be driven. The keys 69 of the clutch mechanisms 66 will drive the cams 65 which will, through the medium of the hubs 63, drive the sprocket wheels 61 and the chains 62. Whereupon the chains 62 will drive the sprocket wheels 60 and the disks 56. As the disks 56 revolve the pins 57 thereon engage the faces of the cam surface 55 of the rocker arms 53 and rock them, which in turn will, through the medium of the U-slot 52, rollers 51 and arms 50, reciprocate the slides 32 towards and from the work table 15.

The cam surfaces 55 of the rocker arms 53 are so shaped that upon each revolution of the disks 56 the slides 32 will be moved towards and from the work table at the correct speed.

When the slides 32 are moved towards the work table 15 the drills 38 in the heads 30 and 31 preferably pass through an aperture 79 in the guides 26 (see Fig. 2). This forms a guide for the ends of the drills and prevents lateral movement thereof when operating on a piece of work.

The keys 69 of the clutch mechanisms 66 are each adapted to be normally retained out of the apertures 71 of the cams 65 by a slide bar 80 having a wedge shaped end 81 which is adapted to engage an angular shoulder 81' on the associated key 69.

Figure 11:
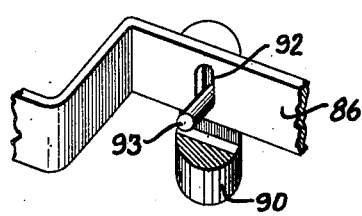
Fig. 11 is a fragmentary perspective view of a foot lever arm and a guide member.

As shown in Fig. 1 each of the slide bars 80 is positioned in a guideway 82 on the base 10 and the end of each of the slide bars 80 is slackly connected as at 83 to a bell crank lever arm 84. Each of the lever arms 84 is mounted on a pivot 54 and is connected as by a rod 85 to a foot lever 86. Each of the foot levers 86 is pivoted as at 87 to the base 10 and provided with a foot pedal 88 having an upwardly extending thumb 89 thereon. Adjacent the foot pedals 88 the levers 86 are each positioned in a guide 90 (Fig. 11) having a slot 91 therein in which the levers are adapted to actuate. As shown in Fig. 11 each of the levers 86 are provided with a slot 92 in which a pin 93 in the guides 90 are positioned to limit the movement of the levers.

For normally urging the slide bars 80 into engagement with the clutch keys 69 to maintain them out of engagement with the cam apertures 71 coiled springs 95 are connected at one end to the lever arms 84 and anchored at their opposite ends to the base 10.

For automatically clamping the work 20 to the table 15 while it is being drilled two sets of automatic clamping mechanisms 97 are provided, each set acting in conjuction with one of the drilling mechanisms. A single one of the sets 97 includes a lever 98 (Fig. 1) pivoted adjacent one end to the base 10 as at 99 and pivotally connected adjacent the opposite end to a push rod 100 as at 101. Intermediate the length of the lever 98 a roller 102 is pivotally secured thereto. This roller is arranged to engage the cam 65. The push rod 100 is pivotally connected as at 103 to a rocker arm 104 which is pivotally supported on a shaft 105 supported by brackets 106 which are secured by the bed 34.

The end of the rocker arm 104 opposite the push rod is provided with a screw threaded boss 107 (see Fig. 6) in which is positioned a screw threaded rod 108 which is adapted to be retained in an adjusted position by clamping nuts 109 and 110. The clamping nut 110 is shown as adapted to be retained in position adjacent the boss 107 by a bracket 112 secured to the rocker arm 105 as by bolts 113. The lower end of the screw rod 108 is provided with a reduced tip 114 (Fig. 7) in which is provided an elongated slot 115.

A clamping bolster 116 having ears 117 thereon is adapted to be slackly secured to the reduced tip 114 as by a pin 118 which is adapted to be positioned in apertures 119 in the ears 117 and in the slot 115 of the reduced tip. Elongated apertures 120 are provided in each of the ears 117 in which a flat bowed spring 121 is adapted to be positioned.

A wooden shoe 122 is preferably secured to the bolster 116 as by screws 123 to prevent the bolster from moving the work upon which it operates.

From the foregoing description it will be apparent that when the motor 45 is operating and the operator of the machine steps on the foot pedal 88 and moves the lever 86 downward the rod 85 will rock the lever arm 84 which will move the slide bar 80 out of engagement with the clutch key 69 and allow the spring 72 to move the key into the aperture 71 in the cam 65 thereby driving the cam and the slide reciprocating mechanism as previously described.

The cam 65 is so shaped that when it is revolved it will, through the medium of the roller 102, raise the lever 98 which in turn will move the push rod 100 upward and cause it to raise the rear end of the rocker arm 104. As the rocker arm is thus moved it pivots on the shaft 105 causing the forward end of the rocker arm to move downward thereby moving the clamping bolster 116 into engagement with the work. The shape of the cam 65 is such that it retains the clamping bolster in engagement with the work until the drilling operation is completed whereupon it allows the lever arm to move downward and release the tension of the clamping bolster on the work.

When it is desired to actuate both of the drilling mechanisms at the same time the operator of the machine places his foot on the thumbs 89 of both of the lever pedals 88 and moves them downward, whereupon both of the drill heads 30 and 31 are moved to and from the work supporting table 15.

In Figs. 12, 13 and 14 we have shown a modified form of drilling device which is adapted to be mounted on the bed 34 instead of the heads 30 and 31. In this modification a pair of slides 125 are positioned in the undercut grooves 33 of the bed 34. Upon each slide is mounted a bearing 126 in which a drill holder or chuck 127 is mounted. A drill 128 is adapted to be positioned in each chuck.

An electric motor 129 is positioned on the bed 34 and the armature shaft of the motor is provided with a gear 130 (Figs. 12 and 13). A housing 132 is preferably provided around the gear 130 and in this housing a pair of shafts 133 are journaled and are each provided with a gear 134 which is adapted to mesh with the gear 130. The opposite ends of each of the shafts 133 are adapted to be positioned in a recess 135 in each of the drill chucks 127 and are each provided with a keyway 136 in which a spline 137 on the drill chucks is adapted to be positioned so that upon rotation of the shafts 133 the drill chucks 127 will be rotated.

The motor 129 may be provided with a set of step pulleys 138 to drive the feed and clamping mechanisms similar to the set of step pulleys 78 shown in Figs. 1 and 8.

Each of the slides 125 are provided with a downwardly extending arm 139 on which a roller 140 is journaled which is adapted to be positioned in the U-groove 52 of the rocker arms 53.

Upon actuation of the foot pedal levers 86 the slides 125 will be actuated in the same manner as previously described in connection with the slides 32.

In Fig. 15 we have shown another modified form of drilling device which is similar to the device shown in Figs. 12, 13 and 14. This modification comprises a pair of slides 142 similar to the slides 125 which are adapted to be positioned in the undercut grooves 33 of the bed 34 and upon each of which is mounted a bearing 143 similar to the bearings 126 in which a shaft 144 is mounted for rotation. Each of the shafts 144 are provided with a drill holding chuck 145 in which drills 146 may be positioned.

The opposite ends of the shafts 144 are positioned in hubs 147 journaled in a housing 148 which is secured to an electric motor 149 mounted on the bed 34. Each of the shafts 144 is adapted to be rotatably connected to the hubs 147 by a key 150. Each of the hubs 147 is provided with a gear 151 which is adapted to be driven from a gear 152 on the armature shaft of the motor 149. The slides 142 are adapted to be reciprocated by the rocker arms 53 in the same manner as previously described in connection with the slides 125 and 32.

Having thus described our invention, we claim:

1. A drilling machine including a base, a bed on said base, a plurality of slides mounted on said bed for horizontal reciprocating movement towards and from said work table, a drill head on each of said slides, a drill chuck in each head, means in each of said heads whereby to drive said drill chuck, said means including a shaft for each head, a motor including an armature shaft, means connecting each of said first mentioned shafts with said armature shaft and means operated by said motor to move said slides towards and from a piece of work.

2. A drilling machine including a base, a plurality of drill heads movably mounted for independent movement on said base, driving means in each of said heads to drive a bit, a motor, means to actuate said driving means from said motor and means operated by said motor to independently advance said drill heads toward a piece of work.

3. In a drilling machine, a plurality of independently reciprocating slides, a drill head on each of said slides, a chuck on each of said drill heads, means in each of said heads whereby its chuck may be driven, a common means whereby said slides are reciprocated and the chucks supported thereon are driven during the reciprocation of the slide, and means cooperating with said slides and said reciprocating means whereby said slides may be operated independently or simultaneously.

4. In a drilling machine including a head, a drill chuck in each head, a base, a bed on said base, a slide on said bed, said slide being adapted to reciprocate on said bed, an arm on said slide, a roller on said arm, a rocker arm pivoted to said base, said rocker arm including a U shaped groove and a cam surface, said roller being positioned in said groove whereby when said rocker arm is actuated said slide will be reciprocated, means to actuate said rocker arm, said means including a disk, a pin on said disk, said pin engaging said rocker arm cam surface, a hub on said disk and a sprocket wheel on said hub, means to drive said sprocket, said means including a shaft, a clutch member secured to said shaft, a second clutch member loosely mounted on said shaft, means to connect said two clutch members, a gear on said shaft, a motor on said base and means to drive said gear from said motor, a sprocket wheel on said loosely mounted clutch member and a sprocket chain connecting said first sprocket wheel and said second sprocket wheel.

5. In a drilling machine including a base, a work supporting table, a bed on said base, a slide on said bed, said slide being adapted to reciprocate on said bed, an arm on said slide, a roller on said arm, a rocker arm pivoted to said base, said rocker arm including a U shaped groove and an internal cam surface, said roller being positioned in said groove whereby when said rocker arm is actuated said slide will be reciprocated, means to actuate said rocker arm, said means including a disk, a pin on said disk, said pin adapted to engage said rocker arm internal cam surface, a hub on said disk, and a sprocket wheel on said hub, means to drive said sprocket, said means including a shaft, a clutch member secured to said shaft, a second clutch member loosely mounted on said shaft, means to connect said two clutch members, a gear on said shaft, a motor on said base and means to drive said gear from said motor, a sprocket wheel on said loosely mounted clutch member and a sprocket chain connecting said first sprocket wheel and said second sprocket wheel, an automatic clamping mechanism adapted to clamp work to said table during movement of said slide, a rod on said base, said clamping mechanism comprising a rocker arm pivoted intermediate its length to said rod, a push rod pivotally connected adjacent one end of said rocker arm, a lever pivotally connected adjacent the opposite end of said push rod, said lever being pivoted to said base, a roller on said lever intermediate its length, a cam on said loosely mounted clutch member, said roller being adapted to engage said cam and said last mentioned cam being so shaped that upon one revolution of said shaft it will first raise said push rod, hold it raised for a period and then lower said push rod and a clamping shoe on said rod, adapted to engage a piece of work on said work table.

6. A drilling machine including a base, a work supporting table on said base, a plurality of slides mounted on said base for horizontal reciprocating movement, a drill head on each of said slides, a chuck on each of said heads, a shaft for driving each chuck, a sprocket on each shaft, means on each of said sprockets coacting with means on said shafts to slidingly support each sprocket on its shaft, whereby said sprockets are adapted to drive said shafts, a rocker arm adjacent to each slide, a motor connected to drive each sprocket, means on each of said slides engaging a rocker arm to reciprocate each slide independently of the other slide, a disk adjacent each of said rocker arms, means on each disk adapted to engage one of said rocker arms, means to drive said disks from said motor, clutch means to control the driving of each of said disks, said clutch means being interposed between said motor and said disks, operating pedals adapted to control the actuation of each of said clutch mechanisms, said pedals being operable separately and having means thereon whereby both may be actuated simultaneously.

7. A drilling machine including a base, a work supporting table on said base, a plurality of slides mounted on said base for horizontal reciprocating movement to and from said work table, a drill head on each of said slides, a chuck on each of said drill heads, operating means in each of said heads to drive its chuck, a motor, means to independently actuate each of said operating means from said motor, a rocker arm cooperating with each of said slides adapted to reciprocate said slides independently, a disk adjacent each of said rocker arms and means on said disks adapted to engage said rocker arms, means to drive said disks from said motor and clutch means interposed between said motor and said disks adapted to control the driving of each of said disks, operating pedals adapted to control the actuation of each of said clutch mechanisms, said pedals being operable separately and means, operable upon actuation of said clutch to reciprocate said slides, to clamp the work on said table to said table during a drilling operation.

8. A drilling machine including a base, a work supporting table, a bed on said base, a plurality of slides mounted on said bed for horizontal reciprocatable movement, a drill head on each of said slides, a chuck on each of said drill heads, means in each of said heads to drive its chuck, said means including a rearwardly extending shaft, a sprocket on each of said shafts, said shafts being reciprocatable independent of said sprockets and means on each of said sprockets coacting with means on said shafts whereby said sprockets are adapted to rotate said shafts, a motor including an armature shaft, a pair of sprockets on said armature shaft and means connecting each of said first mentioned sprockets with one of said sprockets on said armature shaft, a rocker arm mounted to cooperate with each of said slides adapted to reciprocate said slides independently, a disk adjacent each of said rocker arms and means on said disks adapted to engage said rocker arms, means to drive said disks from said motor, clutch means interposed between said motor and said disks and adapted to control the driving of each of said disks, operating pedals adapted to control the actuation of each of said clutch mechanisms, said pedals being operable separately and having means thereon whereby they may both be actuated simultaneously, and means, operable upon actuation of said clutch to reciprocate said slides, to clamp the work on said work table to said table during a drilling operation.

In testimony whereof, we hereunto affix our signatures.

JOHN W. KOEHL.
CARL PALKOWSKI.
STEFAN WAGNER.